(12) United States Patent
Nakamura et al.

(10) Patent No.: US 10,010,974 B2
(45) Date of Patent: Jul. 3, 2018

(54) WELDING METHOD, WELDING DEVICE, AND METHOD FOR MANUFACTURING BATTERY

(75) Inventors: Hideo Nakamura, Toyota (JP); Tooru Sugiyama, Nagakute (JP); Seiichi Matsumoto, Toyota (JP); Noriaki Yamamoto, Okazaki (JP); Yoshinori Shibata, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 684 days.

(21) Appl. No.: 14/401,189

(22) PCT Filed: May 15, 2012

(86) PCT No.: PCT/JP2012/062425
§ 371 (c)(1),
(2), (4) Date: Jan. 28, 2015

(87) PCT Pub. No.: WO2013/171848
PCT Pub. Date: Nov. 21, 2013

(65) Prior Publication Data
US 2015/0158119 A1 Jun. 11, 2015

(51) Int. Cl.
*B23K 26/32* (2014.01)
*B23K 26/03* (2006.01)
(Continued)

(52) U.S. Cl.
CPC .......... *B23K 26/034* (2013.01); *B23K 26/032* (2013.01); *B23K 26/0622* (2015.10);
(Continued)

(58) Field of Classification Search
CPC .. B23K 26/034; B23K 26/0622; B23K 26/21; B23K 26/032; B23K 26/32;
(Continued)

(56) References Cited

U.S. PATENT DOCUMENTS 6,329,635 B1 * 12/2001 Leong ................. B23K 26/032
219/121.63
2006/0011592 A1 1/2006 Wang et al.
(Continued)

FOREIGN PATENT DOCUMENTS

| CN | 102400015 A | 4/2012 |
| JP | S3-2563 U | 1/1988 |

(Continued)

*Primary Examiner* — Brian Jennison
(74) *Attorney, Agent, or Firm* — Hunton Andrews Kurth LLP

(57) ABSTRACT

Disclosed is a technique for quickly detecting a defect of a portion welded by laser beam welding. Specifically disclosed is a welding step in which a welding device is used, the welding device welding an object to be welded with a pulsed laser. In the welding step, a first photodetector receives only infrared rays having a wavelength allowing detection of a keyhole formed in a molten pool from among infrared rays radiating from a welded portion during the welding of the object, and an analyzer determines quality of the welded portion on the basis of intensity of the infrared rays received by the first photodetector.

17 Claims, 9 Drawing Sheets

(51) Int. Cl.
  *B23K 31/12* (2006.01)
  *H01M 2/02* (2006.01)
  *B23K 26/0622* (2014.01)
  *B23K 26/21* (2014.01)
  *H01M 2/04* (2006.01)
  *B23K 103/10* (2006.01)
  *B23K 103/08* (2006.01)
  *B23K 101/36* (2006.01)

(52) U.S. Cl.
  CPC .............. *B23K 26/21* (2015.10); *B23K 26/32* (2013.01); *B23K 31/125* (2013.01); *H01M 2/02* (2013.01); *B23K 2201/36* (2013.01); *B23K 2203/08* (2013.01); *B23K 2203/10* (2013.01); *H01M 2/0439* (2013.01)

(58) Field of Classification Search
  CPC ................ B23K 31/125; B23K 26/206; B23K 2201/36; B23K 2203/08; B23K 2203/10
  See application file for complete search history.

(56) References Cited

U.S. PATENT DOCUMENTS

2010/0247992 A1* 9/2010 Miyata ................ B23K 26/206
   429/94
2010/0279171 A1 11/2010 Matsumoto et al.

FOREIGN PATENT DOCUMENTS

| JP | S63-2563 U | 1/1988 |
|----|------------|--------|
| JP | H05261576 A | 10/1993 |
| JP | H05-337662 A | 12/1993 |
| JP | 2000-153379 A | 6/2000 |
| JP | 2005288481 A | 10/2005 |
| JP | 2001-098442 A | 4/2007 |
| JP | 2009-127075 A | 6/2009 |
| JP | 2009-287116 A | 12/2009 |
| JP | 2010-115680 A | 5/2010 |
| JP | 2010285693 A | 12/2010 |
| JP | 2012-006036 A | 1/2012 |
| WO | 2010-016182 A1 | 2/2010 |

* cited by examiner

WELDING METHOD, WELDING DEVICE, AND METHOD FOR MANUFACTURING BATTERY

CROSS-REFERENCE TO RELATED APPLICATION

This is a national phase application based on the PCT International Patent Application No. PCT/JP2012/062425 filed May 15, 2012, the entire contents of which are incorporated herein by reference.

TECHNICAL FIELD

The present invention relates to a technique for detecting a defect of a portion welded by laser beam welding.

BACKGROUND ART

Conventionally, keyhole-type welding is widely known as a method for securing relatively large depth (for example, not less than 0.3 mm) of weld penetration in laser beam welding.

The keyhole-type welding is a welding method using a laser beam having high power density, and realizes relative large depth of weld penetration by utilizing a hole (keyhole) formed in a molten pool by pressure of metal vapor.

The keyhole-type welding is used for products whose welded portion requires long-term durability, such as a case of a car battery.

However, the keyhole-type welding may cause a defect (underfill) that the welded portion is recessed when molten metal is blown away because of high output value of the laser beam.

On the other hand, if the output value of the laser beam is reduced in order to minimize occurrence of the underfill, the keyhole may not be formed, and thereby the desired depth of weld penetration cannot be secured (penetration shortage occurs).

When the above-mentioned defect occurs in the welded portion of the product, desired durability cannot be secured. Therefore, the welded portion of the product must be inspected.

Generally, the inspection of the welded portion of the product is performed by an operator with the naked eye. Therefore, the inspection requires a great deal of time.

The Patent Literature 1 discloses a technique for shortening the time required for the above-mentioned inspection.

The technique disclosed in the Patent Literature 1 detected a defect of a welded portion on the basis of intensity of plasma light radiating from a base metal during laser beam welding, and intensity of reflected light of a laser beam.

However, it is difficult to detect the above-mentioned defects such as the underfill using the technique disclosed in the Patent Literature 1 because of the following reasons:

The plasma light is generated by heating components of the base metal and shielding gas, and has no correlation with the underfill and the keyhole.

The reflected light is widely varied by a state of a reflecting surface, behavior of a molten pool and the like, and has low correlation with the underfill and the keyhole.

CITATION LIST

Patent Literature

Patent Literature 1: JP 2000-153379 A

SUMMARY OF INVENTION

Problem to be Solved by the Invention

The objective of the present invention is to provide a technique for quickly detecting a defect of a portion welded by laser beam welding.

Means for Solving the Problem

A first aspect of the invention is a welding method for welding an object to be welded using a pulsed laser, including a step for selecting infrared rays having a wavelength allowing detection of a keyhole formed in a molten pool from among infrared rays radiating from a welded portion during welding of the object, and a step for determining quality of the welded portion on the basis of intensity of the selected infrared rays.

Preferably, a penetration shortage occurring in the welded portion is detected on the basis of the intensity of the selected infrared rays during one pulse output of the pulsed laser.

Preferably, a first integrated value is calculated by integrating the intensity of the selected infrared rays during one pulse output of the pulsed laser with respect to time, and the first integrated value is compared with a first threshold. If the first integrated value is more than the first threshold, it is determined that the penetration shortage does not occur in the welded portion. If the first integrated value is less than or equal to the first threshold, it is determined that the penetration shortage occurs in the welded portion.

Preferably, an underfill occurring in the welded portion is detected on the basis of the intensity of the selected infrared rays from a point in time just after the output of one pulse of the pulsed laser until after a lapse of a predetermined time.

Preferably, a second integrated value is calculated by integrating the intensity of the selected infrared rays from a point in time just after the output of one pulse of the pulsed laser until after the lapse of the predetermined time with respect to time, and the second integrated value is compared with a second threshold. If the second integrated value is less than the second threshold, it is determined that the underfill does not occur in the welded portion. If the second integrated value is more than or equal to the second threshold, it is determined that the underfill occurs in the welded portion.

Preferably, a continuous wave laser is superimposed on the pulsed laser, and the underfill occurring in the welded portion is detected on the basis of intensity of the continuous wave laser reflected on the welded portion from a point in time just after the output of one pulse of the pulsed laser until after the lapse of the predetermined time.

Preferably, when the intensity of the selected infrared rays is sharply increased during one pulse output of the pulsed laser, an output value of the pulsed laser is reduced.

A second aspect of the invention is a welding device for welding an object to be welded using a pulsed laser, including an optical system which irradiates the object with the pulsed laser, and reflects infrared rays radiating from a welded portion of the object, a first photodetector which receives only infrared rays having a wavelength allowing detection of a keyhole formed in a molten pool from among the infrared rays reflected by the optical system, and an analyzer which determines quality of the welded portion on the basis of intensity of the infrared rays received by the first photodetector.

Preferably, the welding device includes a second photodetector. The optical system superimposes a continuous wave laser on the pulsed laser, and reflects the continuous wave laser reflected on the object to the second photodetector, the second photodetector receives the continuous wave laser reflected by the optical system, and the analyzer detects the underfill occurring in the welded portion on the basis of intensity of the continuous wave laser received by the second photodetector.

A third aspect of the invention is a method for manufacturing a battery including a case accommodating an electrode body, including a step for welding the case by the above-mentioned welding method.

Effects of the Invention

The present invention makes it possible to quickly detect a defect of a portion welded by laser beam welding.

DESCRIPTION OF EMBODIMENTS

Figure 1:
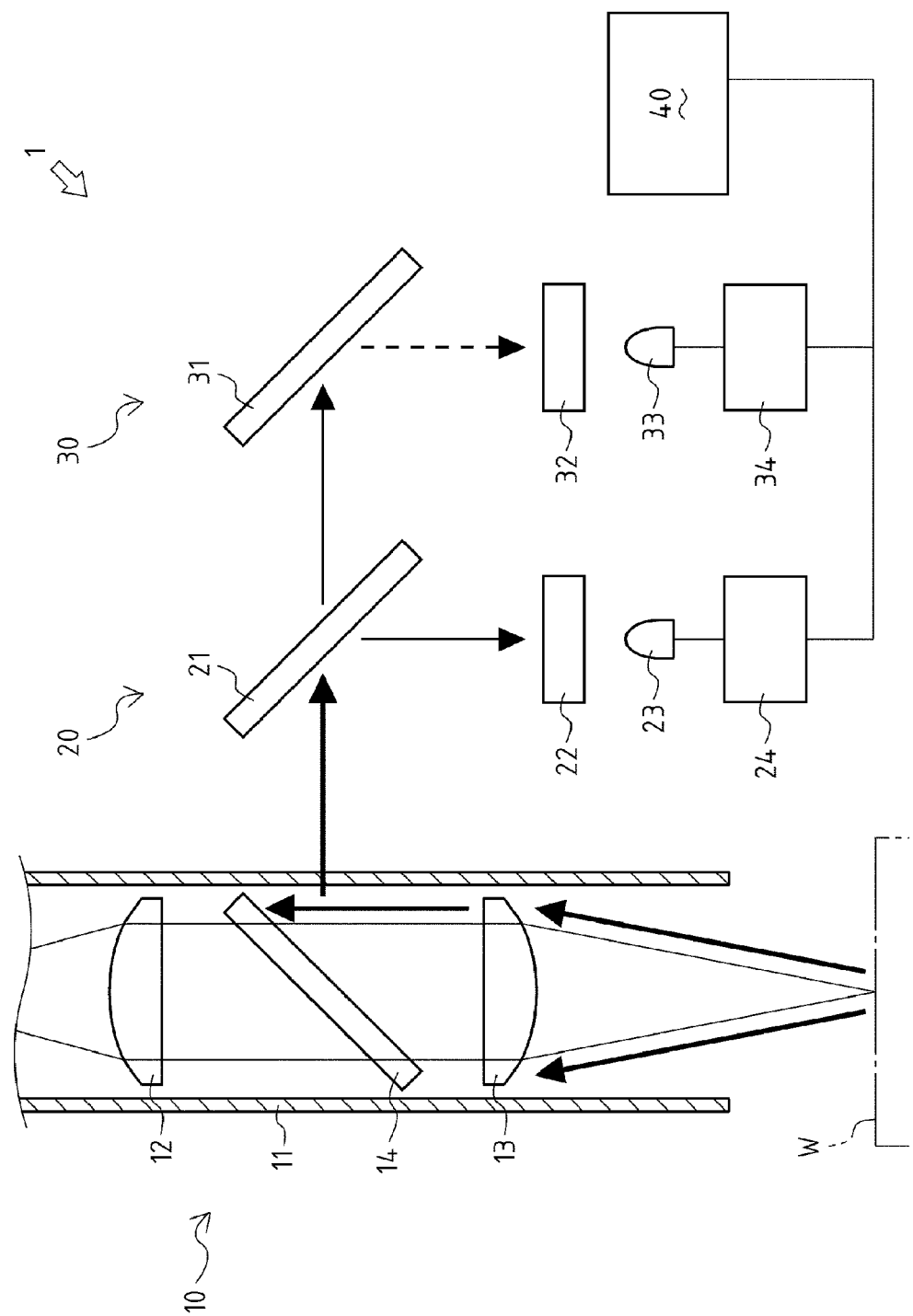
FIG. 1 shows a welding device according to an embodiment of the present invention.
Figure 2:
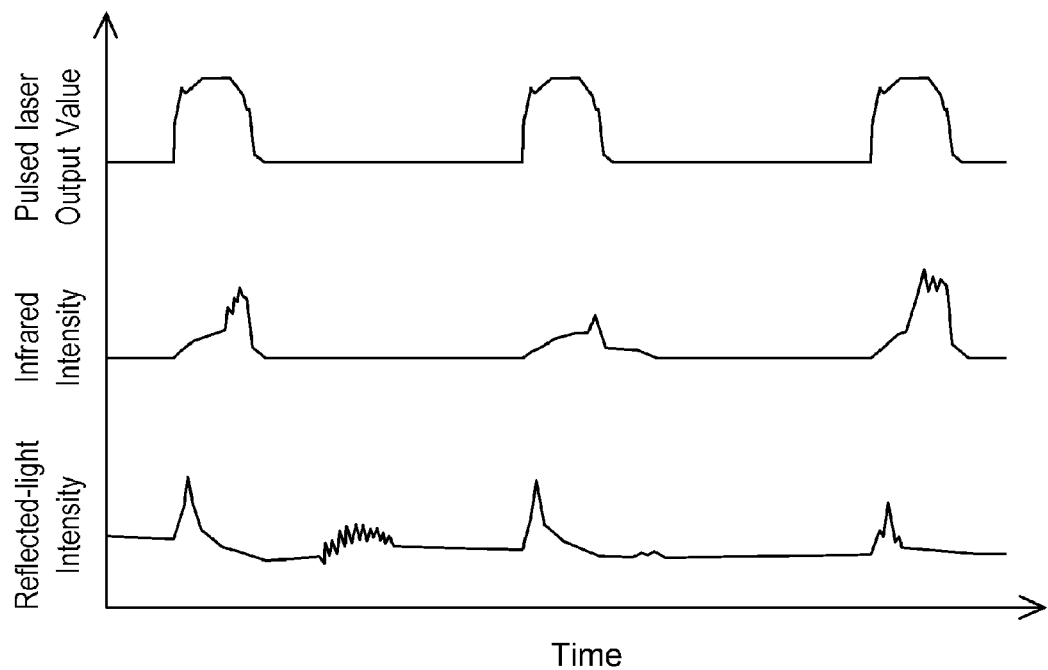
FIG. 2 shows a waveform of infrared intensity, a waveform of intensity of reflected light and a waveform of an output value of a pulsed laser.

With reference to FIGS. 1 to 2, described below is a welding device 1 as an embodiment of a welding device according to the present invention.

The welding device 1 welds an object to be welded with a laser, and detects a defect of a welded portion.

For convenience of explanation, a top-bottom direction in FIG. 1 is defined as a top-bottom direction of the welding device 1.

As shown in FIG. 1, the welding device 1 includes a torch 10, a first photodetector 20, a second photodetector 30, and an analyzer 40.

The torch 10 irradiates a workpiece W as an object to be welded with a predetermined laser beam.

The torch 10 is connected to a pulsed-laser oscillator and a CW-laser oscillator through optical fibers (not shown). The torch 10 is configured to emit a laser beam (hereinafter, referred to as "superimposed laser") made by superimposing a pulsed laser oscillated by the pulsed-laser oscillator and a continuous wave (CW) laser oscillated by the CW-laser oscillator on each other.

In the present embodiment, a YAG laser (wavelength: 1064 nm) is used as the pulsed laser, and a semiconductor laser (wavelength: 808 nm) is used as the CW laser.

The torch 10 has a housing 11, a collimating lens 12, a condensing lens 13, and a mirror 14.

The housing 11 is a hollow member whose lower end is opened, and acts as an exterior of the torch 10. The collimating lens 12, the condensing lens 13 and the mirror 14 are stored in the housing 11, and the collimating lens 12, the mirror 14 and the condensing lens 13 are arranged at predetermined intervals in this order from the upper side.

The collimating lens 12 transforms the superimposed laser incident thereon from the upper side into a parallel light.

The condensing lens 13 condenses the superimposed laser transformed into the parallel light by the collimating lens 12.

By condensing the superimposed laser with the condensing lens 13, energy density of the pulsed laser constituting the superimposed laser can be high enough to perform keyhole-type welding with respect to the workpiece W.

The keyhole-type welding is a welding method using a laser beam having high power density, and realizes relative large depth (0.4 mm or more in the present embodiment) of weld penetration by utilizing a hole (keyhole) formed in a molten pool by metal vapor.

The mirror 14 is a half mirror which transmits the superimposed laser transformed into the parallel light by the collimating lens 12, and reflects infrared rays radiating from a welded portion during the welding of the workpiece W, and the CW laser reflected on the workpiece W (hereinafter, referred to as "CWL-reflected light") to the first photodetector 20 and the second photodetector 30.

As mentioned above, the collimating lens 12, the condensing lens 13 and the mirror 14 function as an optical system which obtains the superimposed laser having such high energy density that the keyhole-type welding of the workpiece W can be performed to irradiate the workpiece W with the superimposed laser, and which reflects the infrared rays generated during the welding of the workpiece W and the CWL-reflected light to the first photodetector 20 and the second photodetector 30.

The first photodetector 20 receives only infrared rays whose wavelength is 1480 nm from among the infrared rays reflected by the optical system (the collimating lens 12, the condensing lens 13 and the mirror 14) of the torch 10, and measures intensity thereof.

The first photodetector 20 has a first mirror 21, a first optical filter 22, a first photodiode 23, and a first amplifier 24.

The first mirror 21 is a half mirror which reflects parts of the infrared rays to the first photodiode 23 and the CWL-reflected light reflected by the mirror 14, and which transmits the other parts of the infrared rays and the CWL-reflected light.

The first optical filter 22 transmits only infrared rays whose wavelength is 1480 nm from among the infrared rays reflected by the first mirror 21. In the present embodiment, a band-pass filter transmitting light whose wavelength is 1480±30 nm is used as the first optical filter 22.

The first optical filter 22 is arranged between the first mirror 21 and the first photodiode 23 and on paths of the infrared rays and the CWL-reflected light reflected by the first mirror 21.

The first photodiode 23 receives the infrared rays (wavelength: 1480 nm) which have passed through the first optical filter 22, and outputs a current signal corresponding to the intensity thereof. Preferably, a converging lens is suitably arranged between the first photodiode 23 and the first optical filter 22 so as to converge the infrared rays reaching the first photodiode 23.

The first photodiode 23 is electrically connected to the first amplifier 24.

The first amplifier 24 turns the current signal outputted by the first photodiode 23 into a voltage signal. The voltage signal outputted by the first amplifier 24 signifies the intensity (hereinafter, referred to as "infrared intensity") of the infrared rays (wavelength: 1480 nm) received by the first photodetector 20.

The first amplifier 24 is electrically connected to the analyzer 40.

The second photodetector 30 receives the CWL-reflected light (wavelength: 808 nm) reflected by the optical system (the collimating lens 12, the condensing lens 13 and the mirror 14) of the torch 10, and measures the intensity thereof.

The second photodetector 30 has a second mirror 31, a second optical filter 32, a second photodiode 33, and a second amplifier 34.

The second mirror 31 is a half mirror which reflects a parts of the infrared rays and the CWL-reflected light which have passed through the first mirror 21 to the second photodiode 33, and which transmits the other parts of the infrared rays and the CWL-reflected light.

A mirror which reflects all the infrared rays and the CWL-reflected light having passed through the first mirror 21 to the second photodiode 33 may alternatively be used as the second mirror 31.

The second optical filter 32 transmits only the CWL-reflected light (wavelength: 808 nm) reflected by the second mirror 31. In the present embodiment, a band-pass filter transmitting light whose wavelength is 808±30 nm is used as the second optical filter 32.

The second optical filter 32 is arranged between the second mirror 31 and the second photodiode 33 and on paths of the infrared rays and the CWL-reflected light reflected by the second mirror 31.

The second photodiode 33 receives the CWL-reflected light which has passed through the second optical filter 32, and outputs a current signal corresponding to the intensity thereof. Preferably, a converging lens is suitably arranged between the second photodiode 33 and the second optical filter 32 so as to converge the CWL-reflected light reaching the second photodiode 33.

The second photodiode 33 is electrically connected to the second amplifier 34.

The second amplifier 34 turns the current signal outputted by the second photodiode 33 into a voltage signal. The voltage signal outputted by the second amplifier 34 signifies the intensity (hereinafter, referred to as "reflected-light intensity") of the CWL-reflected light received by the second photodetector 30.

The second amplifier 34 is electrically connected to the analyzer 40.

The analyzer 40 determines the quality of the welded portion during the welding of the workpiece W. The analyzer 40 determines the quality of the welded portion on the basis of the infrared intensity measured by the first photodetector 20 and the reflected-light intensity measured by the second photodetector 30. Details of the determination by the analyzer 40 are described later.

The analyzer 40 is electrically connected to the pulsed-laser oscillator and the CW-laser oscillator (not shown), and controls output values of the laser beams oscillated by the pulsed-laser oscillator and the CW-laser oscillator.

FIG. 2 shows a waveform of the infrared intensity, a waveform of the reflected-light intensity and a waveform of the output value of the pulsed laser.

In a graph shown in FIG. 2, the vertical axis represents the infrared intensity, the reflected-light intensity and the output value of the pulsed laser, and the horizontal axis represents time.

The waveforms in FIG. 2 are vertically aligned for convenience.

With reference to FIGS. 3 to 9, described below is a welding step S1 using the welding device 1 as an embodiment of a welding method according to the present invention.

The welding step S1 is a step in which the welding device 1 performs laser beam welding of the workpiece W as an object to be welded, and detects the defect of the welded portion.

In the welding step S1, when the torch 10 irradiates the workpiece W with the superimposed laser to weld the workpiece W, the infrared intensity and the reflected-light intensity are continuously measured by the first photodetector 20 and the second photodetector 30, and are sent to the analyzer 40.

Figure 3:
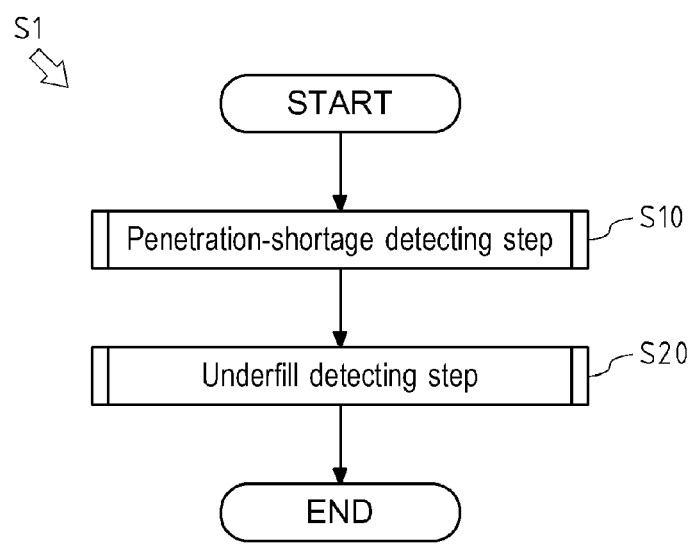
FIG. 3 shows a step performed by an analyzer in a welding method according to an embodiment of the present invention.

As shown in FIG. 3, in the welding step S1, the analyzer 40 performs a penetration-shortage detecting step S10 and an underfill detecting step S20.

In the present embodiment, the underfill detecting step S20 is performed after the penetration-shortage detecting step S10. However, the penetration-shortage detecting step S10 may be performed after the underfill detecting step S20, or these steps may be performed in parallel.

The penetration-shortage detecting step S10 is a step for determining whether penetration shortage occurs in the welded portion of the workpiece W or not.

The "penetration shortage" is a defect meaning that a desired depth (for example, 0.4 mm or more) of weld penetration is not obtained.

Figure 4:
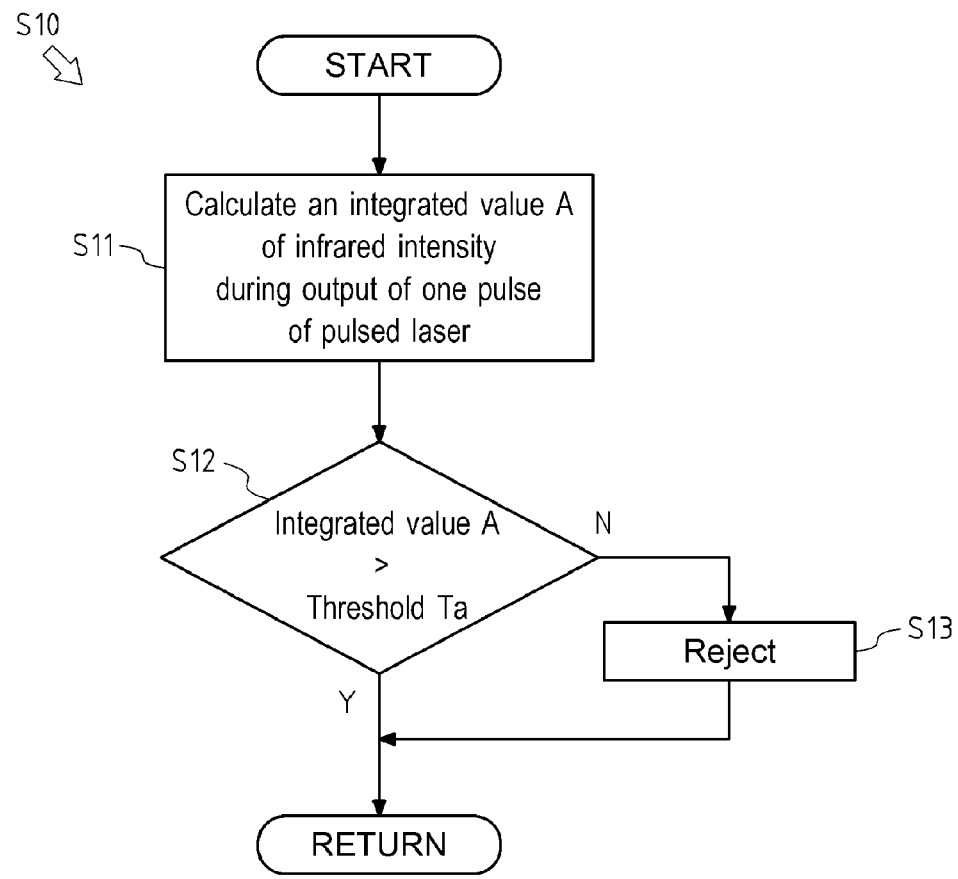
FIG. 4 shows a penetration-shortage detecting step.

As shown in FIG. 4, in the penetration-shortage detecting step S10, the analyzer 40 performs steps S11 to S13.

In the step S11, the analyzer 40 integrates the infrared intensity during the output of one pulse of the pulsed laser with respect to time to calculate an integrated value A. The analyzer 40 performs the step S12 after the step S11.

In the step S12, the analyzer 40 compares the integrated value A calculated in the step S11 with a threshold Ta previously determined by experiment or the like.

If the integrated value A is more than the threshold Ta, the analyzer 40 determines that the penetration shortage does not occur in the welded portion of the workpiece W, and finishes the penetration-shortage detecting step S10.

If the integrated value A is less than or equal to the threshold Ta, the analyzer 40 determines that the penetration shortage occurs in the welded portion of the workpiece W, and performs the step S13.

Figure 5:
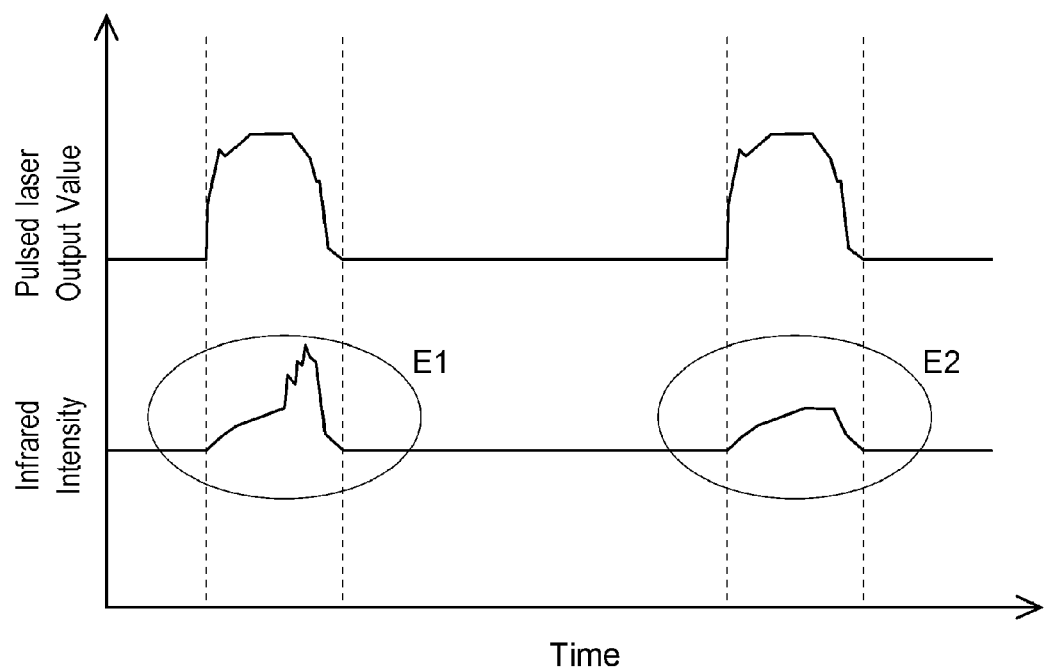
FIG. 5 shows a waveform of the infrared intensity during one pulse output of the pulsed laser when penetration shortage does not occur, and a waveform of the infrared intensity during one pulse output of the pulsed laser when the penetration shortage occurs.

FIG. 5 shows a waveform (a part surrounded by an ellipse E1 in FIG. 5) of the infrared intensity during one pulse output of the pulsed laser when the penetration shortage does not occur in the welded portion of the workpiece W, and a waveform (a part surrounded by an ellipse E2 in FIG. 5) of the infrared intensity during one pulse output of the pulsed laser when the penetration shortage occurs in the welded portion of the workpiece W.

As shown in FIG. 5, the waveform of the infrared intensity during one pulse output of the pulsed laser when the penetration shortage does not occur in the welded portion of the workpiece W has a peak value larger than that of the waveform of the infrared intensity during one pulse output of the pulsed laser when the penetration shortage occurs in the welded portion of the workpiece W, and has large values as a whole.

This is because, if the penetration shortage does not occur in the welded portion of the workpiece W and the desired depth of weld penetration is obtained, the keyhole is formed during the welding of the workpiece W. In other words, forming the keyhole in the molten pool brings relatively large depth of weld penetration. When the keyhole is formed, temperature of the circumference of the keyhole reaches substantially a boiling point of the workpiece W, and a surface area of the molten pool is increased by the keyhole, whereby the infrared intensity becomes relatively large.

Therefore, the determination of whether the penetration shortage occurs in the welded portion of the workpiece W or not can be performed on the basis of the integrated value A calculated by integrating the infrared intensity during the one pulse output of the pulsed laser with respect to time.

In the present embodiment, the wavelength of the infrared rays received by the first photodetector 20 is 1480 nm. However, the wavelength may be changed as long as the wavelength corresponds to temperature close to the boiling point of an object to be welded, namely, temperature at which the keyhole is formed. In other words, the wavelength of the infrared rays received by the first photodetector 20 is selected so that presence or absence of the keyhole may be detected.

For example, in the case where the object to be welded is metal consisting primarily of aluminum, the wavelength of the infrared rays used for detecting the defect is preferably 1200 to 1600 nm. The boiling point of aluminum is approximately 2520° C., and the wavelength of the infrared rays corresponding to this temperature is approximately 1000 nm according to Wien's displacement law. However, this wavelength is close to the wavelength (1064 nm) of the YAG laser used as the pulsed laser. Therefore, the pulsed laser itself becomes a noise which makes it difficult to detect presence or absence of the keyhole. On the other hand, the temperature of the surface of the aluminum during the welding reaches approximately 1500° C. Accordingly, if the wavelength of the infrared rays is larger than 1600 nm, it is difficult to distinguish between the temperature of the molten aluminum and the temperature at which the keyhole is formed.

Therefore, in the case where the object to be welded is metal consisting primarily of aluminum, the wavelength of the infrared rays used for detecting the defect is 1200 to 1600 nm, thus enabling to accurately determine whether the keyhole is formed or not during the welding.

In the present embodiment, it is determined using the integrated value A whether the penetration shortage occurs in the welded portion of the workpiece W or not. However, another value associated with the infrared intensity during the one pulse output of the pulsed laser may alternatively be used for the determination.

For example, a phenomenon that the infrared intensity is sharply increased when the keyhole is formed is utilized, and a differentiated value of the infrared intensity may be used for the determination. On the other hand, a peak value, a mean value or a total value of the infrared intensity during the one pulse output of the pulsed laser may be used for the determination.

As shown in FIG. 4, if the analyzer 40 determines in the step S12 that the penetration shortage occurs in the welded portion of the workpiece W, the analyzer 40 determines in the step S13 that the welded portion of the workpiece W has the defect.

In this case, a predetermined operation such as removal of the workpiece W whose welded portion has the defect is performed.

As mentioned above, in the penetration-shortage detecting step S10, on the basis of the infrared intensity during the one pulse output of the pulsed laser, the penetration shortage occurring in the welded portion of the workpiece W can quickly be detected.

The underfill detecting step S20 (see FIG. 3) is a step for determining whether underfill occurs in the welded portion of the workpiece W or not.

The "underfill" is a defect that the welded portion is recessed when molten metal is blown away because of the keyhole formed in the molten pool.

Figure 6:
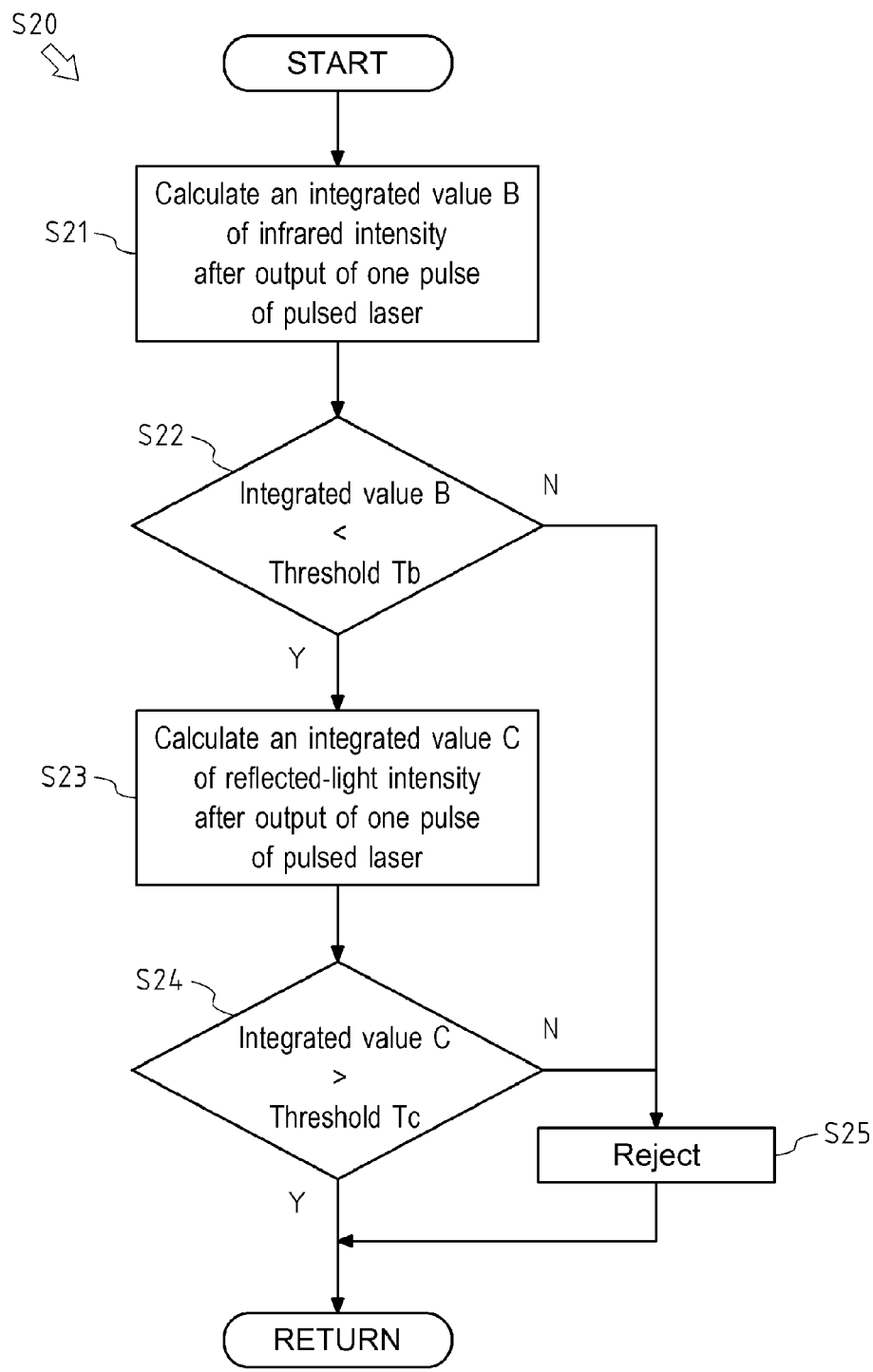
FIG. 6 shows an underfill detecting step.

As shown in FIG. 6, in the underfill detecting step S20, the analyzer 40 performs steps S21 to S25.

In the step S21, the analyzer 40 integrates the infrared intensity from the point in time just after the output of one pulse of the pulsed laser until after a lapse of a predetermined time (time shorter than the time between the pulses, e.g., 1 to 5 ms) with respect to time to calculate an integrated value B.

The analyzer 40 performs the step S22 after the step S21.

In the step S22, the analyzer 40 compares the integrated value B calculated in the step S21 with a threshold Tb previously determined by experiment or the like.

If the integrated value B is less than the threshold Tb, the analyzer 40 determines that the underfill does not occur in the welded portion of the workpiece W, and performs the step S23.

If the integrated value B is more than or equal to the threshold Tb, the analyzer 40 determines that the underfill occurs in the welded portion of the workpiece W, and performs the step S25.

Figure 7:
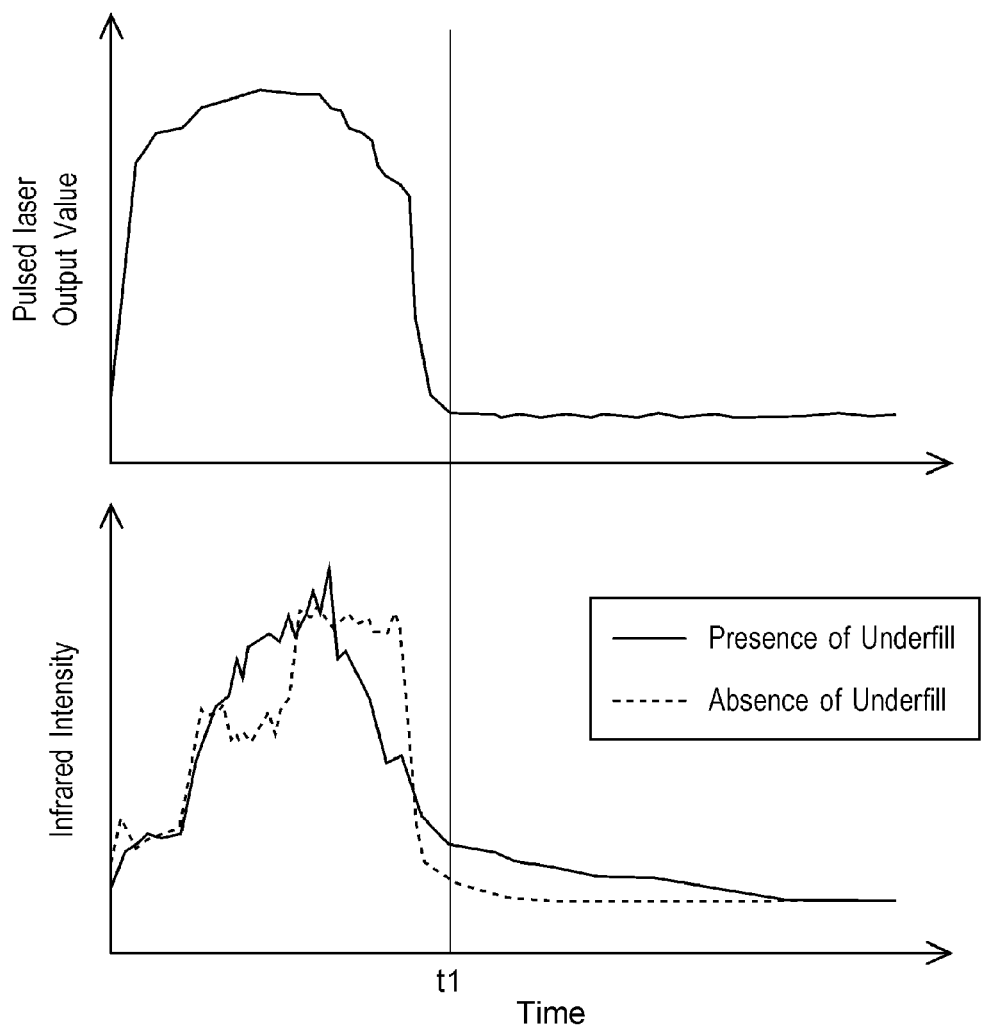
FIG. 7 shows a waveform of the infrared intensity after one pulse output of the pulsed laser when underfill does not occur, and a waveform of the infrared intensity after one pulse output of the pulsed laser when the underfill occurs.

FIG. 7 shows a waveform of the infrared intensity when the underfill does not occur in the welded portion of the workpiece W (a waveform of the infrared intensity indicated by a dotted line in FIG. 7), and a waveform of the infrared intensity when the underfill occurs in the welded portion of the workpiece W (a waveform of the infrared intensity indicated by a solid line in FIG. 7).

As shown in FIG. 7, from the point in time (time t1 in FIG. 7) just after the output of one pulse of the pulsed laser until after a lapse of the predetermined time, the waveform of the infrared intensity when the underfill occurs has large values as a whole compared with the waveform of the infrared intensity when the underfill does not occur.

This is because the molten metal is blown away during the welding and the welded portion is recessed, which results in an increase in the surface area of the welded portion, and consequently in an increase in the amount of the infrared rays radiating therefrom.

Therefore, the determination of whether the underfill occurs in the welded portion of the workpiece W or not can be performed on the basis of the integrated value B calculated by integrating the infrared intensity from the point in time just after the output of one pulse of the pulsed laser until after a lapse of a predetermined time (time shorter than the time between the pulses, e.g., 1 to 5 ms) with respect to time.

In the underfill detecting step S20, similarly to the penetration-shortage detecting step S10, the wavelength of the infrared rays received by the first photodetector 20 is set to a value capable of detecting presence or absence of the keyhole. Since the underfill is the defect which occurs when the keyhole is formed in the molten pool, the intensity of the infrared rays having the wavelength capable of detecting presence or absence of the keyhole is used, thus enabling to determine whether the underfill occurs in the welded portion of the workpiece W or not.

In the present embodiment, it is determined using the integrated value B whether the underfill occurs in the welded portion of the workpiece W or not. However, another value associated with the infrared intensity from the point in time just after the output of one pulse of the pulsed laser until after a lapse of a predetermined time may alternatively be used for the determination.

For example, a mean value or a total value of the infrared intensity from the point in time just after the output of one pulse of the pulsed laser until after a lapse of a predetermined time may be used for the determination.

As shown in FIG. 6, if the analyzer 40 determines in the step S22 that the underfill does not occur in the welded portion of the workpiece W, the analyzer 40 integrates the reflected-light intensity from the point in time just after the output of one pulse of the pulsed laser until after a lapse of a predetermined time (until the molten object to be welded solidifies, for example) with respect to time to calculate an integrated value C in the step S23.

The analyzer 40 performs the step S24 after the step S23.

In the step S24, the analyzer 40 compares the integrated value C calculated in the step S23 with a threshold Tc previously determined by experiment or the like.

If the integrated value C is more than the threshold Tc, the analyzer 40 determines that the underfill does not occur in the welded portion of the workpiece W, and finishes the underfill detecting step S20.

If the integrated value C is less than or equal to the threshold Tc, the analyzer 40 determines that the underfill occurs in the welded portion of the workpiece W, and performs the step S25.

Figure 8:
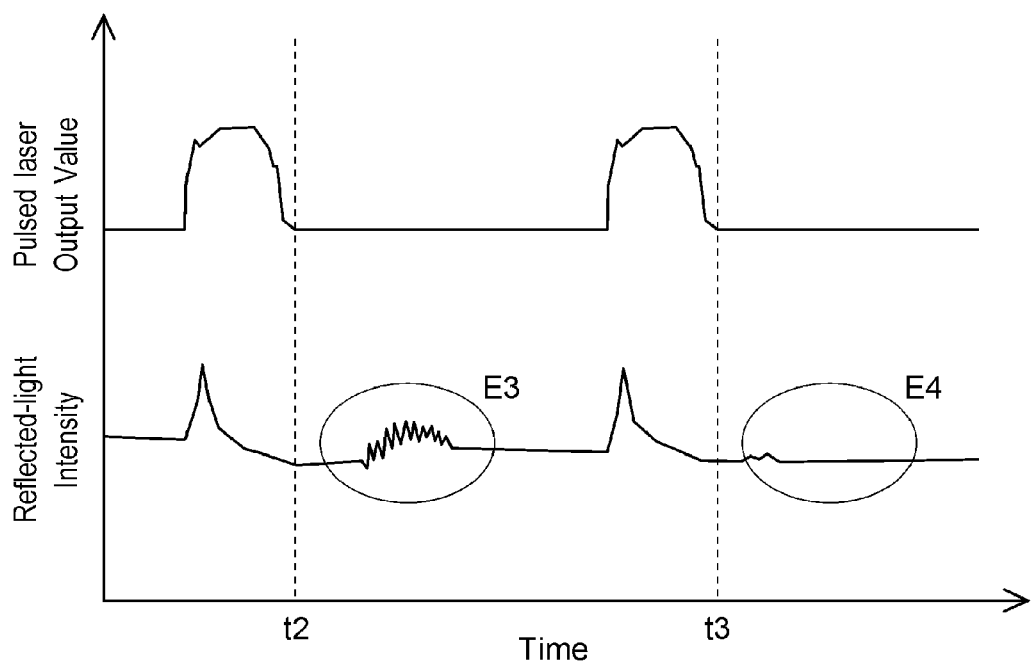
FIG. 8 shows a waveform of the intensity of the reflected light during one pulse output of the pulsed laser when the underfill does not occur, and a waveform of the intensity of the reflected light during one pulse output of the pulsed laser when the underfill occurs.

FIG. 8 shows a waveform (a part surrounded by an ellipse E3 in FIG. 8) of the reflected-light intensity during one pulse output of the pulsed laser when the underfill does not occur in the welded portion of the workpiece W, and a waveform (a part surrounded by an ellipse E4 in FIG. 8) of the reflected-light intensity during one pulse output of the pulsed laser when the underfill occurs in the welded portion of the workpiece W.

As shown in FIG. 8, the reflected-light intensity when the underfill does not occur in the welded portion of the workpiece W sharply increases and decreases repeatedly from the point in time (time t2 in FIG. 8) just after the output of one pulse of the pulsed laser until after a lapse of the predetermined time. In contrast, the reflected-light intensity when the underfill occurs in the welded portion of the workpiece W has small variation from the point in time (time t3 in FIG. 8) just after the output of one pulse of the pulsed laser until after a lapse of the predetermined time.

This is because, though the reflected light is scattered on the molten pool when the underfill does not occur because of vibration of the molten pool, the reflected light is not scattered when the underfill occurs because of absence of most molten pool resulted from blowing-away of the molten metal.

Therefore, the determination of whether the underfill occurs in the welded portion of the workpiece W or not can be performed on the basis of the integrated value C calculated by integrating the reflected-light intensity from the point in time just after the output of one pulse of the pulsed laser until after a lapse of a predetermined time (until the molten object to be welded solidifies, for example) with respect to time.

In the present embodiment, it is determined using the integrated value C whether the underfill occurs in the welded portion of the workpiece W or not. However, another value associated with the reflected-light intensity from the point in time just after the output of one pulse of the pulsed laser until after a lapse of a predetermined time may alternatively be used for the determination.

For example, a mean value or a total value of the reflected-light intensity from the point in time just after the output of one pulse of the pulsed laser until after a lapse of a predetermined time may be used for the determination.

As shown in FIG. 6, if the analyzer 40 determines in the step S22 or S24 that the underfill occurs in the welded portion of the workpiece W, the analyzer 40 determines in the step S25 that the welded portion of the workpiece W has the defect.

In this case, a predetermined operation such as removal of the workpiece W whose welded portion has the defect is performed.

As mentioned above, in the underfill detecting step S20, the determination (the steps S21 and S22) using the integrated value B associated with the infrared intensity and the determination (the steps S23 and S24) using the integrated value C associated with the reflected-light intensity are performed. If the workpiece W passes both the determinations, it is finally determined that the underfill does not occur in the welded portion of the workpiece W.

Thus, in the underfill detecting step S20, the underfill occurring in the welded portion of the workpiece W can quickly be detected on the basis of the infrared intensity and the reflected-light intensity from the point in time just after the output of one pulse of the pulsed laser until after a lapse of a predetermined time.

In the underfill detecting step S20, it may be determined whether the underfill occurs in the welded portion of the workpiece W or not by performing only the determination (the steps S21 and S22) using the integrated value B associated with the infrared intensity without performing the determination (the steps S23 and S24) using the integrated value C associated with the reflected-light intensity. In this case, the welding device 1 may be configured not to measure the reflected-light intensity (not to have the CW-laser oscillator, the second photodetector 30 and the like).

In the welding step S1, the output value of the pulsed laser may be controlled on the basis of the infrared intensity during the one pulse output of the pulsed laser.

Figure 9:
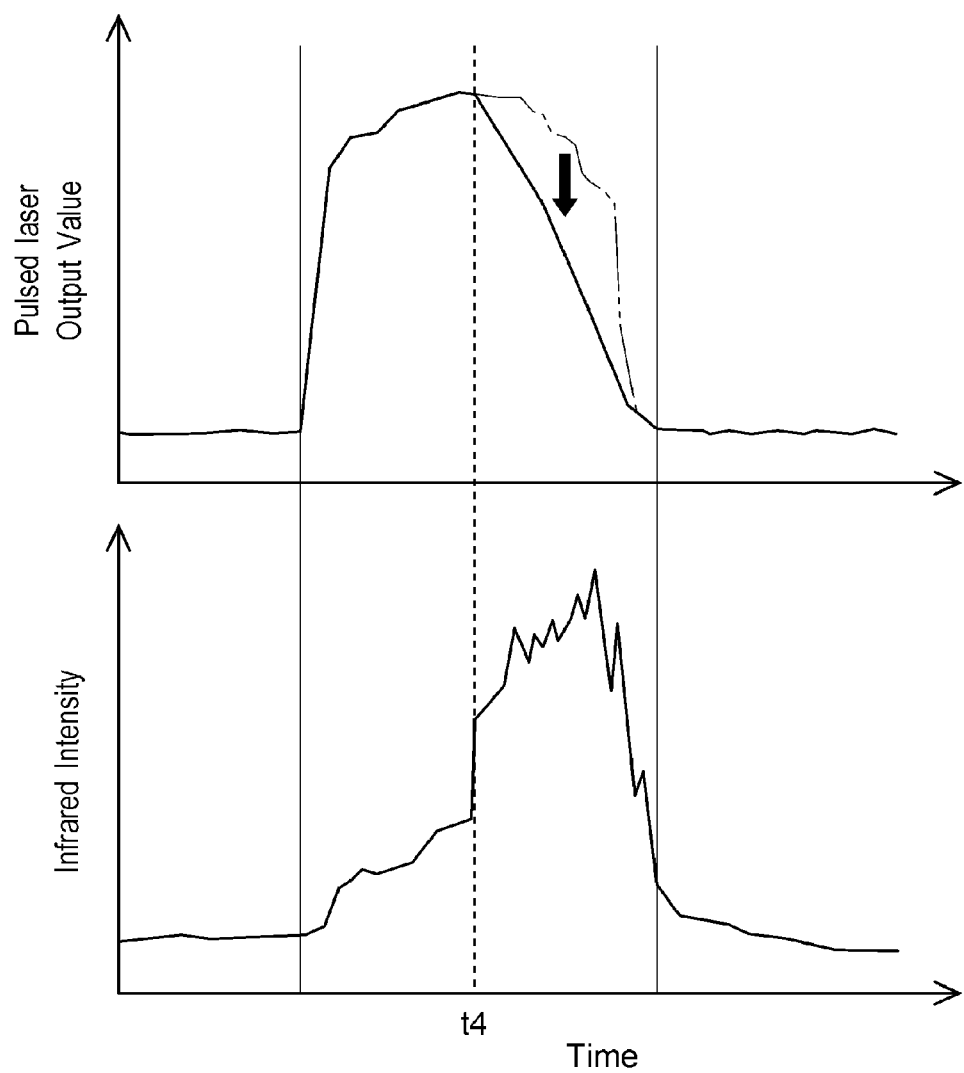
FIG. 9 shows control of an output value of the pulsed laser on the basis of the infrared intensity during one pulse output of the pulsed laser.

As shown in FIG. 9, when the analyzer 40 determines that the infrared intensity is sharply increased during the one pulse output of the pulsed laser, the analyzer 40 reduces the output value of the pulsed laser (see the output value of the pulsed laser at and after a time t4 in FIG. 9).

As an index for determining that the infrared intensity is sharply increased, the differentiated value of the infrared intensity may be used.

The sharp increase in the infrared intensity during the one pulse output of the pulsed laser signifies that the keyhole is formed in the molten pool. When the keyhole is formed in the molten pool, the vibration of the molten pool becomes strong, whereby a possibility of occurrence of the underfill is increased.

Therefore, as mentioned above, the output value of the pulsed laser is reduced when the infrared intensity is sharply increased, thus enabling to shorten a time for which the keyhole is maintained, and consequently to minimize the occurrence of the underfill.

The welding method according to the present invention may be applied to a step for manufacturing a sealed battery.

Figure 10:
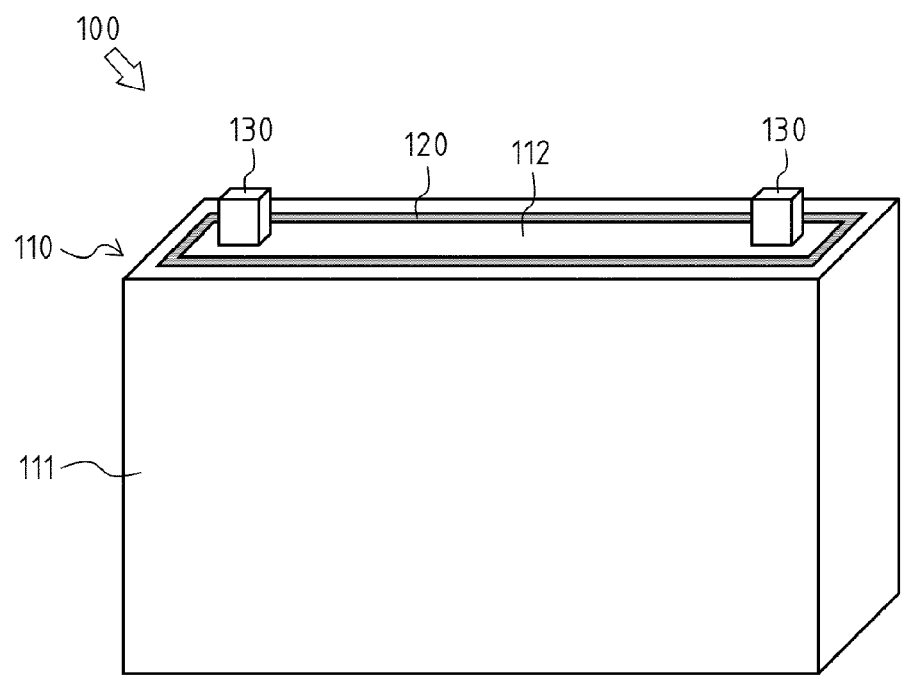
FIG. 10 shows a battery according to an embodiment of the present invention.

With reference to FIG. 10, described below is a step for manufacturing a battery 100 as an embodiment of a method for manufacturing a battery according to the present invention.

The step for manufacturing the battery 100 includes a welding step using the welding device 1.

First, the battery 100 is described.

The battery 100 is a sealed battery.

As shown in FIG. 10, the battery 100 includes a case 110.

The case 110 accommodates an electrode body (not shown) and an electrolyte solution. The case 110 is the object to be welded by the welding device 1.

The electrode body is made by laminating and winding a pair of sheet-like electrodes (positive and negative electrodes) with a separator interposed therebetween. The electrode body functions as a power generation element when the electrode body is impregnated with the electrolyte solution.

The case 110 has a storage part 111 and a lid part 112.

The storage part 111 is a substantially rectangular parallelepiped box, and one (an upper surface in FIG. 10) of surfaces thereof is open. The electrode body and the electrolyte solution are stored in the storage part 111.

The lid part 112 is a flat plate with a shape corresponding to the open face of the storage part 111. The lid part 112 is joined to the storage part 111 by the laser beam welding with the welding device 1. Specifically, a boundary part between the lid part 112 and the storage part 111 is melted by the superimposed laser emitted by the welding device 1. Then, a welded part 120 is formed by solidification of the melted part so that the lid part 112 is joined to the storage part 111.

Moreover, two openings through which two terminals 130 can penetrate are formed in the lid part 112, and the terminals 130 are fixed to the openings.

The terminals 130 are electrically connected to the electrode body.

In one of the terminals 130, one end thereof is electrically connected to the positive electrode of the electrode body, and the other end thereof is arranged to protrude to the outside of the casing 110 through the lid part 112.

In the other terminals 130, one end thereof is electrically connected to the negative electrode of the electrode body, and the other end thereof is arranged to protrude to the outside of the casing 110 through the lid part 112.

In the step for manufacturing the battery 100, the welding step is performed after the electrode body is stored in the storage part 111 of the case 110.

The welding step is a step in which the welding device 1 performs the laser beam welding of the casing 110.

In the welding step, while the open face of the storage part 111 is closed by the lid part 112, the storage part 111 and the lid part 112 are welded to each other by the welding device 1.

At this time, if the analyzer 40 of the welding device 1 detects a defect of the welded part of the storage part 111 and the lid part 112, the member (for example, the casing 110) having the defect is determined as a defective product, and is removed.

If no defects are detected and the welded part 120 is formed in the boundary part between the storage part 111 and the lid part 112, the following steps (step for pouring the electrolyte solution into the case 110, and the like) are sequentially performed to manufacture the battery 100.

INDUSTRIAL APPLICABILITY

The present invention is applied to a technique for detecting a defect of a portion welded by laser beam welding.

REFERENCE SIGNS LIST

1: welding device
10: torch
11: housing
12: collimating lens (optical system)
13: condensing lens (optical system)
14: mirror (optical system)
20: first photodetector
21: first mirror
22: first optical filter
23: first photodiode
24: first amplifier
30: second photodetector
31: second mirror
32: second optical filter
33: second photodiode
34: second amplifier
40: analyzer
100: battery
110: case
120: welded part

The invention claimed is:

1. A welding method, comprising:
welding an object using a pulsed laser;
transmitting one part of infrared rays with wavelength of 1200 nm to 1600 nm generated during the welding of the object with a first optical filter;
measuring intensity of the transmitted one part of the infrared rays with a first photodetector receiving the transmitted infrared rays; and
determining quality of welded portion of the object based on the measured intensity of the transmitted infrared rays with an analyzer;
wherein the first optical filter is arranged on paths of the infrared rays radiated from the welded portion during the welding of the object and transmits the infrared rays with wavelength of 1200 nm to 1600 nm to allow detection of a keyhole formed in a molten pool during the welding of the object.

2. The welding method according to claim 1, further comprising
detecting a penetration shortage occurring in the welded portion based on the intensity of the transmitted infrared rays during one pulse output of the pulsed laser with the analyzer.

3. The welding method according to claim 2, further comprising
calculating a first integrated value by integrating the intensity of the transmitted infrared rays during the one pulse output of the pulsed laser with respect to time by the analyzer,
comparing the first integrated value with a first threshold by the analyzer,
determining whether or not the penetration shortage occurs, wherein if the first integrated value is more than the first threshold, the penetration shortage does not occur in the welded portion, and if the first integrated value is less than or equal to the first threshold, the penetration shortage occurs in the welded portion.

4. The welding method according to claim 1, further comprising
detecting an underfill occurring in the welded portion based on the intensity of the transmitted infrared rays from a point in time just after the one pulse output of the pulsed laser until after a lapse of a predetermined time with the analyzer.

5. The welding method according to claim 4, further comprising
calculating a second integrated value by integrating the intensity of the transmitted infrared rays from a point in time just after the one pulse output of the pulsed laser until after the lapse of the predetermined time with respect to time by the analyzer,
comparing the second integrated value with a second threshold by the analyzer,
determining whether or not the underfill occurs, wherein if the second integrated value is less than the second threshold, the underfill does not occur in the welded portion, and if the second integrated value is more than or equal to the second threshold, the underfill occurs in the welded portion.

6. The welding method according to claim 4, wherein a continuous wave laser is superimposed on the pulsed laser, and the underfill occurred in the welded portion is detected on the basis of intensity of the continuous wave laser reflecting on the welded portion from a point in time just after the one pulse output of the pulsed laser until after the lapse of the predetermined time.

7. The welding method according to claim 1, further comprising
reducing an output value of the pulsed laser when the intensity of the transmitted infrared rays with wavelength of 1200 nm to 1600 nm is increased than a predetermined value during the one pulse output of the pulsed laser.

8. A welding device for welding an object using a pulsed laser, comprising:
an optical system which irradiates the object using the pulsed laser, and reflects infrared rays with a wavelength of 1200 nm to 1600 nm radiating from a welded portion of the object;
a first photodetector which receives the infrared rays having a wavelength of 1200 nm to 1600 nm and allows detection of a keyhole formed in a molten pool from among the infrared rays reflected by the optical system; and
an analyzer which determines quality of the welded portion based on intensity of the infrared rays received by the first photodetector.

9. The welding device according to claim 8, further comprising:
a second photodetector,
wherein the optical system superimposes a continuous wave laser on the pulsed laser, and reflects the continuous wave laser reflected on the object to the second photodetector,
wherein the second photodetector receives the continuous wave laser reflected by the optical system, and
wherein the analyzer detects the underfill occurring in the welded portion on the basis of intensity of the continuous wave laser received by the second photodetector.

10. A welding method, comprising:
welding an object using a pulsed laser;
transmitting one part of infrared rays generated during the welding of the object with a first optical filter;
measuring intensity of the transmitted one part of the infrared rays with a first photodetector receiving the transmitted infrared rays;
determining quality of a welded portion of the object based on the measured intensity of the transmitted infrared rays with an analyzer;
detecting an underfill occurred in the welded portion based on the intensity of the transmitted infrared rays from a point in time just after the one pulse output of the pulsed laser until after a lapse of a predetermined time with the analyzer;
calculating a second integrated value by integrating the intensity of the transmitted infrared rays from a point in time just after the one pulse output of the pulsed laser until after the lapse of the predetermined time with respect to time by the analyzer;
comparing the second integrated value with a second threshold by the analyzer; and
determining whether or not the underfill occurs, wherein if the second integrated value is less than the second threshold, the underfill does not occur in the welded portion, and if the second integrated value is more than or equal to the second threshold, the underfill occurs in the welded portion,
wherein the first optical filter is arranged on paths of the infrared rays radiated from the welded portion during the welding of the object and transmits the predetermined wavelength infrared rays to allow detection of a keyhole formed in a molten pool during the welding of the object.

11. The welding method according to claim 10, further comprising detecting a penetration shortage occurred in the welded portion based on the intensity of the transmitted infrared rays during one pulse output of the pulsed laser with the analyzer.

12. The welding method according to claim 11, further comprising
calculating a first integrated value by integrating the intensity of the transmitted infrared rays during the one pulse output of the pulsed laser with respect to time by the analyzer,
comparing the first integrated value with a first threshold by the analyzer,
determining whether or not the penetration shortage occurs, wherein if the first integrated value is more than the first threshold, the penetration shortage does not occur in the welded portion, and if the first integrated value is less than or equal to the first-threshold, the penetration shortage occurs in the welded portion.

13. The welding method according to claim 10, further comprising reducing an output value of the pulsed laser when the intensity of the transmitted infrared rays is increased than a predetermined value during the one pulse output of the pulsed laser.

14. A welding method, comprising:
welding an object using a pulsed laser;
transmitting one part of infrared rays generated during the welding of the object with a first optical filter;
measuring intensity of the transmitted one part of the infrared rays with a first photodetector receiving the transmitted infrared rays;
determining quality of welded portion of the object based on the measured intensity of the transmitted infrared rays with an analyzer; and
detecting an underfill occurred in the welded portion based on the intensity of the transmitted infrared rays from a point in time just after the one pulse output of the pulsed laser until after a lapse of a predetermined time with the analyzer, wherein
the first optical filter is arranged on paths of the infrared rays radiated from the welded portion during the welding of the object and transmits the predetermined wavelength infrared rays to allow detection of a keyhole formed in a molten pool during the welding of the object; and
a continuous wave laser is superimposed on the pulsed laser, and the underfill occurred in the welded portion is detected based on intensity of the continuous wave laser reflecting on the welded portion from a point in time just after the one pulse output of the pulsed laser until after the lapse of the predetermined time.

15. The welding method according to claim 14, further comprising detecting a penetration shortage occurred in the welded portion based on the intensity of the transmitted infrared rays during one pulse output of the pulsed laser with the analyzer.

16. The welding method according to claim 15, further comprising
calculating a first integrated value by integrating the intensity of the transmitted infrared rays during the one pulse output of the pulsed laser with respect to time by the analyzer,
comparing the first integrated value with a first threshold by the analyzer,
determining whether or not the penetration shortage occurs, wherein if the first integrated value is more than the first threshold, the penetration shortage does not occur in the welded portion, and if the first integrated value is less than or equal to the first-threshold, the penetration shortage occurs in the welded portion.

17. The welding method according to claim 14, further comprising
reducing an output value of the pulsed laser when the intensity of the transmitted infrared rays is increased than a predetermined value during the one pulse output of the pulsed laser.

* * * * *